United States Patent
Larrieu et al.

(10) Patent No.: US 12,493,014 B2
(45) Date of Patent: Dec. 9, 2025

(54) NANOSTRUCTURE PLATFORM FOR CELLULAR INTERFACING AND CORRESPONDING FABRICATION METHOD

(71) Applicant: Centre National De La Recherche Scientifique, Paris (FR)

(72) Inventors: Guilhem Larrieu, Toulouse (FR); Adrien Casanova, Toulouse (FR)

(73) Assignee: Centre National De La Recherche Scientifique, Paris (FR)

( * ) Notice: Subject to any disclaimer, the term of this patent is extended or adjusted under 35 U.S.C. 154(b) by 763 days.

(21) Appl. No.: 16/769,927

(22) PCT Filed: Dec. 3, 2018

(86) PCT No.: PCT/EP2018/083305
§ 371 (c)(1),
(2) Date: Jun. 4, 2020

(87) PCT Pub. No.: WO2019/110485
PCT Pub. Date: Jun. 13, 2019

(65) Prior Publication Data
US 2020/0386710 A1  Dec. 10, 2020

(30) Foreign Application Priority Data

Dec. 5, 2017 (FR) ...................................... 1761651

(51) Int. Cl.
*G01N 27/414* (2006.01)
*A61B 5/24* (2021.01)
(Continued)

(52) U.S. Cl.
CPC ........... *G01N 27/4146* (2013.01); *A61B 5/24* (2021.01); *B82Y 15/00* (2013.01); *G01N 27/4145* (2013.01); *G01N 33/4836* (2013.01)

(58) Field of Classification Search
CPC ........... G01N 27/4146; G01N 27/4145; G01N 33/4836
See application file for complete search history.

(56) References Cited

U.S. PATENT DOCUMENTS 5,923,421 A * 7/1999 Rajic .................... G01N 21/171
422/82.05
7,905,013 B2   3/2011 Zhang et al.
(Continued)

FOREIGN PATENT DOCUMENTS

JP   2009-540798 A   11/2009
JP   2011-519152 A   6/2011
(Continued)

OTHER PUBLICATIONS

Abstract of "Probing electrical activity of single neurons based on 1D nanostructures: From extra to intracellular interfacing," by Casanova et al., Paper/Talk T12-13, P98, IEEE Nanotechnology Materials and Device Conference, Oct. 9-12, 2016, Toulouse, France [hereinafter "Casanova"].*
(Continued)

*Primary Examiner* — Nathan W Ha
(74) *Attorney, Agent, or Firm* — David D. Brush; Westman, Champlin & Koehler, P.A.

(57) ABSTRACT

A platform for cellular interfacing including at least one nano-probe based on nano-wires each having a conductive extremity intended to be in contact with a cell. The platform has at least one field-effect transistor called a nano-FET positioned at a predetermined distance from the nano-probe.

15 Claims, 3 Drawing Sheets

(51) Int. Cl.
*B82Y 15/00* (2011.01)
*G01N 33/483* (2006.01)

(56) References Cited

U.S. PATENT DOCUMENTS

| | | | | | |
|---|---|---|---|---|---|
| 8,362,570 | B2 | 1/2013 | Larrieu et al. | | |
| 8,860,137 | B2* | 10/2014 | Zhou | ............ | H10K 85/221 |
| | | | | | 438/197 |
| 9,379,238 | B2* | 6/2016 | Larrieu | ............ | H01L 29/7827 |
| 10,539,589 | B2* | 1/2020 | Ukraintsev | ............ | H01L 22/14 |
| 11,624,725 | B2* | 4/2023 | Merriman | ............ | B82Y 15/00 |
| | | | | | 506/9 |
| 2004/0248075 | A1* | 12/2004 | Yamaguchi | ............ | B01J 31/0254 |
| | | | | | 435/2 |
| 2005/0064185 | A1* | 3/2005 | Buretea | ............ | H10K 10/466 |
| | | | | | 428/364 |
| 2006/0204428 | A1* | 9/2006 | Noy | ............ | G01N 27/4146 |
| | | | | | 423/445 R |
| 2007/0238186 | A1* | 10/2007 | Sun | ............ | C12Q 1/6811 |
| | | | | | 340/657 |
| 2008/0116490 | A1* | 5/2008 | Stewart | ............ | G01N 27/128 |
| | | | | | 257/210 |
| 2008/0128760 | A1* | 6/2008 | Jun | ............ | H10D 30/43 |
| | | | | | 257/E29.147 |
| 2008/0179586 | A1* | 7/2008 | Kamins | ............ | H10D 10/00 |
| | | | | | 977/932 |
| 2009/0020892 | A1* | 1/2009 | Li | ............ | B82Y 10/00 |
| | | | | | 257/784 |
| 2009/0299213 | A1 | 12/2009 | Patolsky et al. | | |
| 2010/0133510 | A1* | 6/2010 | Kim | ............ | G01N 27/4145 |
| | | | | | 257/253 |
| 2010/0184104 | A1* | 7/2010 | Fahmy | ............ | G01N 33/6863 |
| | | | | | 435/7.92 |
| 2010/0216256 | A1* | 8/2010 | Cheng | ............ | B82Y 15/00 |
| | | | | | 156/60 |
| 2010/0255252 | A1* | 10/2010 | Kim | ............ | H01J 9/025 |
| | | | | | 977/840 |
| 2011/0121400 | A1 | 5/2011 | Larrieu et al. | | |
| 2012/0073992 | A1* | 3/2012 | Kim | ............ | B82Y 15/00 |
| | | | | | 257/E51.023 |
| 2013/0209991 | A1* | 8/2013 | Wang | ............ | A61B 5/1473 |
| | | | | | 435/7.1 |
| 2013/0240983 | A1* | 9/2013 | Larrieu | ............ | H01L 29/4232 |
| | | | | | 257/329 |
| 2014/0029085 | A1* | 1/2014 | Bond | ............ | H01S 3/08059 |
| | | | | | 372/92 |
| 2014/0070170 | A1* | 3/2014 | Andersson | ............ | G01N 27/4146 |
| | | | | | 257/29 |
| 2016/0116427 | A1* | 4/2016 | Laurenson | ............ | B05D 5/00 |
| | | | | | 427/2.13 |
| 2016/0374585 | A1* | 12/2016 | Fonash | ............ | A61B 5/053 |
| | | | | | 600/547 |
| 2017/0018626 | A1* | 1/2017 | Hoffman | ............ | C12Q 1/6869 |
| 2017/0053908 | A1* | 2/2017 | Hoffman | ............ | H10D 62/8303 |
| 2017/0059514 | A1* | 3/2017 | Hoffman | ............ | G01N 33/5438 |
| 2019/0041355 | A1* | 2/2019 | Merriman | ............ | H10D 64/251 |
| 2019/0094175 | A1* | 3/2019 | Merriman | ............ | G01N 27/3278 |
| 2019/0200923 | A1* | 7/2019 | Patolsky | ............ | A61B 5/1473 |
| 2020/0188911 | A1* | 6/2020 | Gagnon | ............ | G01N 27/026 |
| 2020/0386710 | A1* | 12/2020 | Larrieu | ............ | B82Y 15/00 |

FOREIGN PATENT DOCUMENTS

| | | | | |
|---|---|---|---|---|
| KR | 10-20110014411 A * | 2/2011 | ............ | G01N 21/645 |
| KR | 20110014411 A * | 2/2011 | | |
| WO | WO-2006-083349 A2 * | 8/2006 | ............ | G01N 21/645 |
| WO | 2008027078 A2 | 3/2008 | | |
| WO | 2009136095 A2 | 11/2009 | | |
| WO | 2012069606 A2 | 5/2012 | | |
| WO | 2017127551 A1 | 7/2017 | | |
| WO | WO-2019110485 A1 * | 6/2019 | ............ | B82Y 15/00 |

OTHER PUBLICATIONS

Machine English Translation of KR-10-2011-0014411. No Date.*
International Search Report dated Jan. 2, 2019 for corresponding International Application No. PCT/ EP2018/083305, filed Dec. 3, 2018.
Written Opinion of the International Searching Authority dated Jan. 2, 2019, for corresponding International Application No. PCTEP2018/083305, filed Dec. 3, 2018.
Adrien Casanova et al., "Probing electrical activity of single neurons based on 1D nanostructures: from extra to Intracellular interfacing", 2016 IEEE Nanotechnology Materials and Devices Conference (NMDC), Oct. 1, 2016 (2016-10-01), pp. 1-2, XP55501324A.
Moria Kwiat et al., "Highly Ordered Large-Scale Neuronal Networks of Individual Calls - Toward Single Cell to 3D Nanowire Intracellular Interfaces", ACS Applied Materials & Interfaces, vol. 4, No. 7, Jun. 22, 2012 (2012-06-22), pp. 3542-3549, XP05501471.
Michele Dipalo et al., "Intracellular and Extracellular Recording of Spontaneous Action Potentials in Mammalian Neurons and Cardiac Cells with 3D Plasmonic Nanoelectrodes", Nano Letters, vol. 17, No. 6, May 24, 2017 (2017-05-24), pp. 3932-3939, XP055501265.
Long Yang et al., "Nanodevices for Cellular Interfaces and Electrophysiological Recording", Advanced Materials, vol. 25, No. 28, Jul. 26, 2013 (2013-07-26), pp. 3881-3887, XP055501488.
Written Opinion of the International Searching Authority dated Jun. 9, 2020 for corresponding International Application No. PCT/ EP2018/083305, filed Dec. 3, 2018.
Japanese Notice of Reasons for Refusal dated Aug. 23, 2022 for corresponding Japanese Application No. 2020-531128.

* cited by examiner

NANOSTRUCTURE PLATFORM FOR CELLULAR INTERFACING AND CORRESPONDING FABRICATION METHOD

CROSS-REFERENCE TO RELATED APPLICATIONS

This Application is a Section 371 National Stage Application of International Application No. PCT/EP2018/083305, filed Dec. 3, 2018, which is incorporated by reference in its entirety and published as WO 2019/110485 A1 on Jun. 13, 2019, not in English.

1. FIELD OF THE INVENTION

The present technique relates to the fields of nanostructures and more particularly to nanostructures intended for sensing biological phenomena. More particularly, the present technique relates to a platform for measuring and stimulating neural type cells or again cardiomyocytes or more generally any type of cell for which the sensing of an electrical or electrophysiological activity can be envisaged. These could be dissociated cell cultures (neurons, muscle cells, cardiac cells, etc.), organ tissue cultures or slices of tissues (hippocampus, cerebellum, spinal cord, retina, etc.) or cultures of cells derived from stem cells.

2. PRIOR ART

The study of the electrophysiological states of excitable cells (neurons, cardiomyocytes) and groups and networks formed by these cells improves the understanding of the functional and pathological states of the organs to which these cells relate. The electrophysiological state of the cells is conventionally studied with probes that can have access to the interior (the cytoplasm) of the cell, thus enabling measurements of fluctuations of potential of one or more cells in a network of cells. These probes comprise "patch clamps" with glass micropipettes, Pour microelectrode/nano-electrode arrays (MEAs/NEAs) and field-effect transistor nano-wires (nano-probes) and with different materials such as vertical nano-wire arrays made of silicon (Si), platinum (Pt) and iridium oxide (IrOx).

Glass micropipette electrodes using a "patch clamp" method have traditionally been used. They enable high-quality measurements but, on the one hand, they cannot be used simultaneously for a large number of cells (because of the difficulty of implementing these probes) and on the other hand, they lead to the death of the cells in the relatively short term because of the penetration of the micropipette into the cell.

More recently, technological developments have enabled the development of planar microelectrode arrays that have become standard platforms for the study of electrophysiological responses of cell networks over lengthy periods (several weeks). These microelectrode arrays have the advantage of not damaging the envelope of the cells and therefore of not causing the premature death of these cells. However, planar microelectrode arrays have the drawback of not being able to access the cell cytoplasm and therefore being incapable of measuring the variations in potential within the cell as precisely as micropipette electrodes. Now variations in potential constitute important data that must be measured. The main problem however in these existing arrays and platforms is the low cell/microelectrode interaction that induces signals (action potential) that are highly degraded in terms of amplitude and therefore difficult to use.

Microelectrode-based platforms and arrays have been the object of major technological developments, such as those presented in the documents U.S. Pat. No. 7,905,013 and WO2017127551.

In the example of U.S. Pat. No. 7,905,013, a dielectric layer is selectively wet-etched on a conductive layer, forming contact holes with sloped walls in the dielectric layer and exposing regions of the conductive layer. IrOx nano-wire neural interfaces are then developed from exposed regions of the conductive layer. Each of the IrOx nano-wire neural interfaces has a 0.5 to 10 micrometer cross-section, an average height of 10 nanometers (nm) to about 10 micrometers ($\mu$m) and an average diameter of its proximal extremity in the range of about 1 nm to about 1 $\mu$m. The inventors have attached clusters of probes to the chips ranging from 1 to 100 square millimeters. The clusters each comprise 2 up to 12 electrodes situated in a cluster diameter ranging from 5 to 50 micrometers, the number of the clusters on the chip ranging from 2 to 100.

In the example of WO2017127551, an array of neural probe sensors is described. Such an array comprises a substrate with a metal pattern on it. An array of semiconductor vertical nano-wire probes extends away from the substrate, and the probes are addressed electrically and individually, through the metallic pattern. The metallic pattern is insulated with a dielectric and the base parts and the stems of the nano-wires are also preferably insulated. This platform makes it possible to individually stimulate the cells that take position on the nano-wires.

Although they enable measurements of the electrical potentials of the cells that have electrical activity or even the clustering of these cells in ordered networks of cells, these platforms cannot be used to measure, all at the same time, extracellular electrical potentials as well as extracellular ion concentrations. Now obtaining these two pieces of information is preferable in order to enable a better analysis of the electrochemical phenomena that pass through the cell networks.

3. SUMMARY

The present technique has been constructed on the basis of these prior-art problems. More particularly, the present technique relates to a platform for measuring and stimulating neural type cells or again cardiomyocytes and more generally any type of cell for which the sensing of electrical or electrophysiological activity can be envisaged. More particularly, a platform of this type improves prior-art platforms in that it enables the measurement of both the electrical potentials and the ion concentrations with single-cell resolution.

More particularly, a platform is proposed for cellular interfacing comprising at least one nano-probe based on nano-wires each comprising a conductive extremity intended to be in contact with a cell, a platform characterized in that it comprises at least one field-effect transistor called a nano-FET positioned at a predetermined distance from said nano-probe.

Thus it is possible, with this platform, to have available nano-devices for the detection and/or measurement of potential and ion concentration on one and the same device (the platform). More particularly, this platform makes it possible to correlate the electrical potential and the ion currents measured on these cells.

According to one particular embodiment, the platform comprises a set of nano-sensors, each nano-sensor comprising a pair formed by a nano-probe and a nano-FET spaced out by a distance of 1 to 5 micrometers.

Thus, a platform is proposed comprising nano-sensors, for example distributed according to a predetermined scheme, that enables the detection and/or measurement of the electrophysiological activity of cells in culture or in development, without its being necessary to conform the growth and the development of these cells. A platform of this type makes it possible to measure the potentials and the ion concentration of sets of cells with sensitivity greater than that of prior-art platforms, owing to the nano-probe/nano-FET coupling.

According to one particular embodiment, the platform comprises a set of nano-probes and a set of nano-FETs distributed on said platform to form at least one array of nano-sensors comprising at least one predetermined route or track.

Thus, the invention proposes a platform that makes it possible, at the same time, to carry out the extracellular measurement of an electrical potential by means of at least one nano-probe and of an ion current by means of a transistor. Thus the measurements made through such a platform are more precise and more reliable than those made with prior-art platforms and methods.

According to one particular characteristic, the platform further comprises hydrophilic zones localized at the level of the nano-probes and of said at least one nano-FET.

According to one particular characteristic, the platform comprises a plurality of predetermined routes, each predetermined route connecting at least two nano-probes of said array of nano-probes.

According to one particular characteristic, the platform furthermore comprises hydrophilic zones localized at the level of said predetermined routes.

Thus, it is possible to foster the growth of the cells on the hydrophilic zones and therefore it is possible to conform the growth and the development of the cells at the locations in which the nano-probes for measuring and stimulating the cells are disposed.

According to one particular characteristic, each predetermined route between two nano-probes comprises a plurality of nano-FETs, each nano-FET being implanted at regular intervals along the route.

According to one particular characteristic, each predetermined route between two nano-probes comprises a plurality of route nano-probes, each route nano-probe being implanted at regular intervals along the route.

According to one particular embodiment, said at least one nano-probe comprises between one and nine nano-wires.

Thus, the constitution of these nano-probes, based on one to nine wires, promotes the interaction between the probe and the cell; indeed, the inventors have noted that a limited number of wires (and therefore a lower density of wires) on a probe enables the cell and more particularly the soma to match the probe more completely, and ultimately favors the measurement or the stimulation. In one particular embodiment, a soma nano-probe comprises four nano-wires.

According to one particular embodiment, the nano-FET is a fin-FET type of finned transistor.

According to another aspect, the invention also relates to a method for manufacturing a platform for intracellular interfacing that is a top-down type of method. According to the invention, such a method comprises, subsequently to a step of vertical structuring of at least one nano-wire-based nano-probe, a step of planar structuring of at least one field-effect transistor called a nano-FET.

According to one particular characteristic, subsequently to the step of planar structuring of said at least one nano-FET, said method comprises a step of platinum silicidation or silicification prompting the implantation of a layer of platinum silicide (PtSi) on said at least one nano-probe and on the source zone(S) and drain zone (D) of said at least one nano-FET.

According to one particular characteristic, said method furthermore comprises a step for the adjoining, to the nano-wires, of said at least one nano-probe, made of a conductive organic material such as PEDOT:PSS.

According to one particular characteristic, subsequently to the step of planar structuring of said at least one nano-FET, the method comprises a step of functionalization of the surface of said platform defining a plurality of hydrophilic zones.

4. DRAWINGS

Other features and advantages shall appear more clearly from the following description of a preferred embodiment, given by way of a simple, illustrative and non-exhaustive example and from the appended drawings, of which.

5. DESCRIPTION 5.1 Reminder of the Principles

As explained here above, the present technique relates to a detection, measurement and stimulation platform for intra-neural interfacing at the level of the individual cell. The platform relies on nano-devices based on nano-structures with a very high surface/volume ratio (nano-wires (NWs), nano-fins (fins) that combine vertical arrays (clamps) and horizontal arrays (nano-transistors)). These nano-devices are used to carry out high-sensitivity measurements.

Thus, nano-structures form the basis of our recording nano-devices (nano-probes, nano-FETs comprising a PtSi-based interface) that enable very-high-resolution recording while remaining insulated from the culture medium. More particularly, a platform of the present technique comprises measurement and cell-stimulation nano-probes based on vertical nano-wires and, at the same time, field-effect transistors (nano-FETs) for measuring ion concentrations passing through the cells. The combination of these two types of nano-devices on the platform enables the performance of higher-precision measurements while ensuring cell survival over the long term (several days or even weeks) because of the low intrusive nature of the nano-structures as well as the insulation between the culture medium of the cell and the platform. Coupling a nano-probe for measuring action potential with a nano-transistor for measuring concentrations of ion species on the same platform, but above all at a very small distance from each other (a distance equivalent to the size of an individual cell, whatever the cell in question) opens up new fields of study in biology. The distances between the two nano-devices is determined as a function of the target cell. This distance can range from a few tens of nanometers to several micrometers. This pair of sensors can be distributed on the platform in order to measure the electrical activity in a network of electrically excitable cells or tissues or slices of organs comprising electrically excitable cells. The same devices can, at the same time, carry out local excitation (i.e. electrical stimulation) of a cell or a zone of cells and then measure the activity on this cell as well as on the entire network after this stimulation.

According to the present technique, a first embodiment of the platform is formed by pairs of sensors (vertical nano-probes and field-effect transistors, for example of the planar type, spaced out for example at 1 to 5 µm from one another) that are distributed evenly on the useful part of the surface of the platform so as to be able to attain a spatial resolution of the network of cells and/or the organ section studied, without conformation of culture (unlike in the second embodiment). It is made possible, in this embodiment, to study self-organized cells. The term "useful part of the platform" is understood to mean the part that serves to carry out a culture of cells.

According to the present technique, a second embodiment of the platform defines one or more arrays of nano-devices that define positioning locations and pathways (routes) of growth of the extensions of the cells so as to form, during the implementation of a biological process of cell culture and/or cell growth, networks of cells conformed to the arrays of nano-devices of the platform. The technique enables organized cultures of cells.

Whatever the embodiment, a platform that is the object of the present invention can be used, all at the same time, as a platform of detection and/or measurement of potential and of ion concentration but also as a stimulation platform.

According to the present technique, in another aspect, the implementing of these nano-devices is coupled with a surface functionalization capable of specifically locating the cells and guiding the growth of the extensions of these cells. Thus, the arrays of devices implanted on the platforms enable the stimulating and precise recording of the action potentials generated by these cells, directly in somas but also along dendritic and axonal extensions and they achieve this over several weeks.

According to the present technique, horizontal nano-wire transistors disposed along these extensions also enable comparisons of the intra-cellular and extra-cellular recordings.

Thus, according to the present technique, the arrays formed on the platform are subjected to a surface treatment, the particular feature of which is that it favors the implanting and growth of the cells at predefined locations on the platform. More particularly, the platform is subjected to a surface functionalization that makes it possible, in culture, to localize the somas and guide the growth of the neural extensions. It is thus possible to stimulate and record the action potentials generated by these neurons on the platform with precision.

Figure 1:
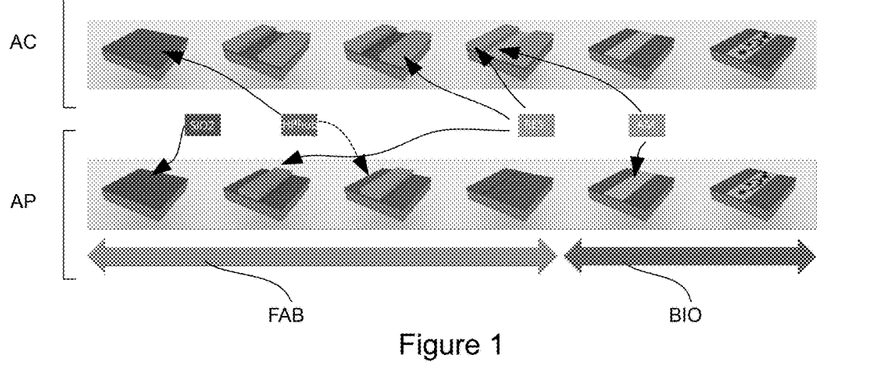
FIG. 1 describes the principle of surface specialization optionally implemented on a platform of the present technique.

More particularly, a self-aligned surface (S-A-F) function is optionally implemented on the platform. According to the present technique, this functionalization is implemented subsequently to the creation of the platform. More particularly, the surface functionalization is carried out after the building of the nano-devices on the platform. Indeed, although the problems and issues related to controlling the location of the somas and their extensions in order to be able to couple these organized cultures with nano-metric recording devices are not new, the current approaches tend to combine the micro-manufacturing of the platform and the biological protocol (consisting in depositing an attractive layer (peptides) on the hydrophilic surface to foster the development of the cells). More particularly, in the conventional approach (A C, FIG. 1) (M. Kwiat, R. Elnathan, A. Pevzner, A. Peretz, B. Barak, H. Peretz, T. Ducobni, D. Stein, L. Mittelman, U. Ashery, and F. Patolsky, "*Highly Ordered Large-Scale Neuronal Networks of Individual Cells Toward Single Cell to* 3*D Nanowire Intracellular Interfaces,*" ACS Appl. Mater. Interfaces, vol. 4, no. 7, pp. 3542-3549 July 2012.), the photolithography step used to define attractive and repulsive zones on the chip must be performed after the hydrophobic treatment (HPhob) of the totality of the substrate. This is a critical step since the resin (RES) adheres with great difficulty to such surfaces (HPhob) and since the quality of the treatment must be downgraded to attain a level of hydrophobicity compatible with the photolithography step. According to the present technique (AP, FIG. 1), in addition to the capacity for measuring both ion concentrations and electrical potentials, and given the limitations of the conventional approach, a complementary chemical functionalization method has been constructed, making it possible to exploit a non-downgraded hydrophobic treatment while at the same time completely dissociating the micro-fabrication protocol (FAB) and the biological protocol (BIO). Contrary to the classical approach, for which the adhesion molecule (AM) is deposited solely on the open zones of the resin structured by lithography, the location of the adhesion molecule is controlled solely by means of the hydrophilic/hydrophobic contrast of the surface.

In order to be as close as possible to the final surface of the chips forming the platform of the (SiO2) sensors, the developments have been obtained on a silicon (Si) substrate coated with about 600 nm of silicon oxide (SiO2). The structuring of the patterns is done by lithography using an i-line stepper photo-repeater on ECI positive resin (1.1 µm), making it possible to obtain a resolution below one micron, as well as excellent alignment precision. A hydrophobic treatment (HPhob) in gas phase is then made on the substrate and gets fixed only on the open zones of the resin. The resin is then removed by successive baths of acetone and then of piranha (H2O2/H2SO4 1:1) solution. At this stage of the functionalization method, the SiO2 surface shows hydrophilic zones (zones previously protected by resin) and hydrophobic zones (open zones HPhob). The grafting of adhesion molecule (AM) (of the adhesion solution, for example polylysine, polyornithine) is then done selectively on the hydrophilic parts. Through this method of self-aligned functionalization, a perfect dissociation is obtained between the white-room micro-fabrication protocol and the biological protocol. The adhesion solution is deposited only at the time of the culture and does not risk getting degraded during the removal of the resin. In addition, the photolithography is done before the hydrophobic treatment of the surface. This prevents problems related to poor clinging of this surface to the hydrophobic substrate and enables the use of a hydrophobic treatment with the best possible performance.

Using such a platform, it is possible to provoke neural stimulation by chemical agents (of a type simulating neurotoxic gases or inducing depolarization) or by biological agents to study, as closely as possible to the cells in culture, the reactions and the processes brought into play, and to do so with the goal of devising and perfecting treatments or molecules suited to curing diseases, and especially neurodegenerative diseases. The nano-probes pick up the potentials chiefly by extracellular measurement. In some cases, the probes can pierce the membrane spontaneously (in very few cases) and measure the intracellular potential. It is possible to force the entry of the probes by opening the lipid membrane through electrical stimulation.

It must be noted that intracellular electrical potential or extracellular electrical potential refer to the same measurement (they are not two different potentials). The difference is that when in extracellular measurement, the value of the potential is attenuated by the membrane of the cell and its resolution is theoretically lower. However, through the nano-probes, the affinity between the nano-probe and the cell is very great. This means that although the measurement is extracellular, it is possible to attain signal resolutions of very high quality, far higher than those measured with conventional micro-electrodes. Whatever the embodiment envisaged, the platform that is the object of the invention offers the possibility of interfacing one and the same cell with two different types of nano-devices, thus offering novel possibilities of studying cells.

5.2. Description of a First Embodiment

Figure 2:
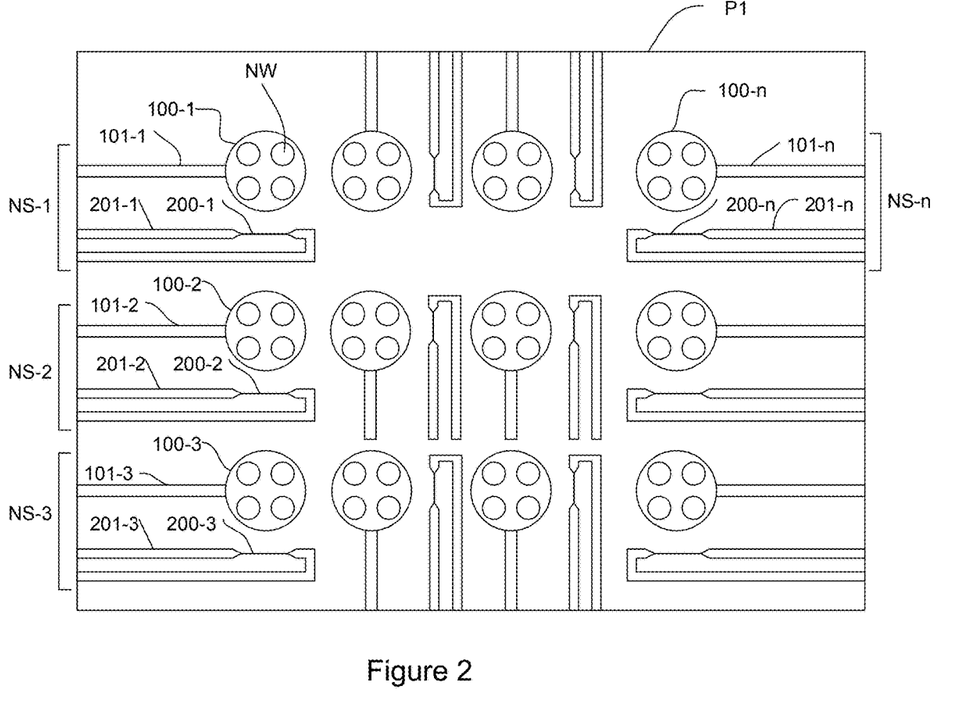
FIG. 2 describes a first embodiment of a platform of the present technique.

As explained here above, the present technique has been implemented to define a platform for the detection, measurement and stimulation of cells, and more particularly of electro-sensitive cells. The present technique relates to a detection and/or measurement and/or stimulation platform based on nano-probes and a method of use of such a platform to carry out electrophysiological measurements. In this first embodiment of the platform of the present technique, as illustrated in FIG. 2, pairs {nano-probes, nano-FETs} are evenly implanted on the platform. The goal in this embodiment is to obtain measurements of action potentials and of ion concentration in the cells. Each pair {nano-probes, nano-FETs} forms an independent nano-sensor. Within a sensor, each nano-device can be addressed independently: each nano-device has at its disposal a line of access from the periphery of the platform. In this embodiment, nano-FETs are finned field-effect transistors also called fin-FETs. The nano-sensors are laid out as a function of needs: the spacing between the nano-sensors, especially, can be a function of the purpose of the platform, i.e. a specialization of the platform, especially at the level of the types of cells to be cultivated: certain types of cells can require greater spacing or smaller spacing between the sensors, for example in order to prevent two sensors from being positioned beneath a single cell. It can be noted that the nano-probes are not constituted by two nano-devices fabricated independently of each other but actually two jointly fabricated nano-devices.

In this first embodiment of the platform of the present technique, as illustrated in FIG. 2, the platform P1 has at its disposal a set of nano-probes (100-1, . . . , 100-n) comprising one to nine vertical nano-wires (NW) (for example four in order to favor the descent of the cell on to the nano-probe, as illustrated in FIG. 2) directly in contact with a conductive line of access (101-1, . . . , 101-n). This set is designed to receive cells in culture or under observation. Each nano-probe, except its tip and its conductive line of access (101-1 . . . ), is coated with an insulating layer (not shown). The nano-probes (100-1, . . . , 100-n) are in communication with a rim of the platform via a dedicated conductive line of access (101-1, . . . , 101-n) that is electrically connectible (connected) to an instrument (also not shown) to generate or detect an electrical signal. The platform can thus be used to study the neuron-neuron interactions, for example by sending an electrical signal into a neuron of a neural network via one or more nano-probes in electrical contact with this neuron and then by detecting the electrical signals of another neuron of the network via the nano-probes in contact with this other neuron.

Figure 4A:
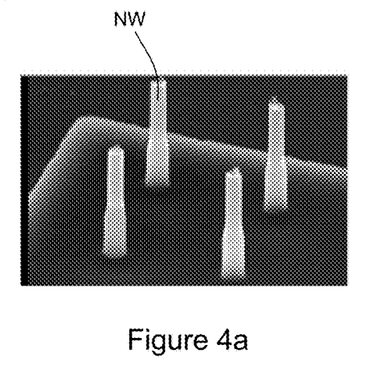
FIG. 4a is a microscopic representation of a nano-probe of the present technique.
Figure 4B:
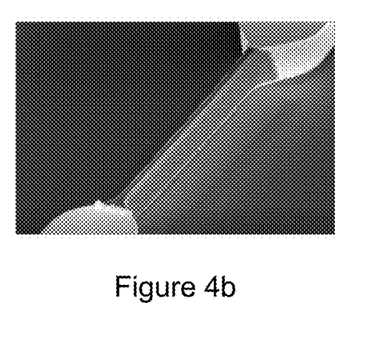
FIG. 4b is a microscopic representation of a nano-FET of the present technique.
Figure 5:
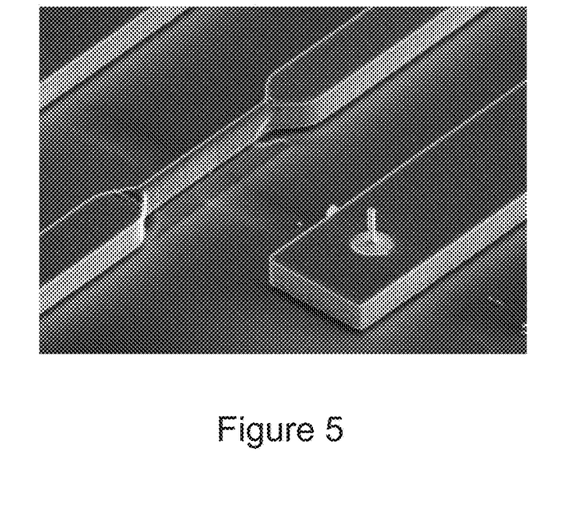
FIG. 5 is a microscopic representation of a nano-sensor comprising a nano-probe and a nano-FET.

In addition to these nano-probes, the platform P1 comprises silicon finned transistors (fin-FETs) enabling the extracellular detection and measurement of the concentrations of ions (ion concentration). These fin-FETs (200-1, . . . , 200-n) are disposed as closely as possible to the nano-probes to measure the resulting ion concentrations. Each fin-FET is associated with a nano-probe in order to form a pair {nano-probe, fin-FET} called a nano-sensor (NS-1, NS-2, . . . , NS-n). The nano-FETs (200-1, . . . , 200-n) are in communication with a rim of the platform via a dedicated conductive line of access (201-1, . . . , 201-n) that is connectable (connected) electrically to an instrument (also not shown) to detect an electrical signal and more particularly an ion concentration by extracellular measurement. Thus, when an electrical activity is propagated in the cells, the nano-probes can measure the potential getting propagated (and especially the speed of propagation of this potential) from one cell to another, as well as the outgoing and incoming electrical potentials, and also as well as the ion concentrations. Only a few sensors are represented in the figure for greater readability. FIG. 4a is a microscopic representation of a nano-probe of the platform with four vertical wires (NW). FIG. 4b is a microscopic representation of a fin-FET of the platform. FIG. 5 is a microscopic representation of a nano-probe with one vertical wire (NW) associated with a fin-FET to form a nano-sensor as presented here above.

In this first embodiment, the goal is to enable an observation of the behaviors of groups of cells in growth and/or in culture without any constraint on these cells.

5.3. Description of a Second Embodiment.

Figure 3:
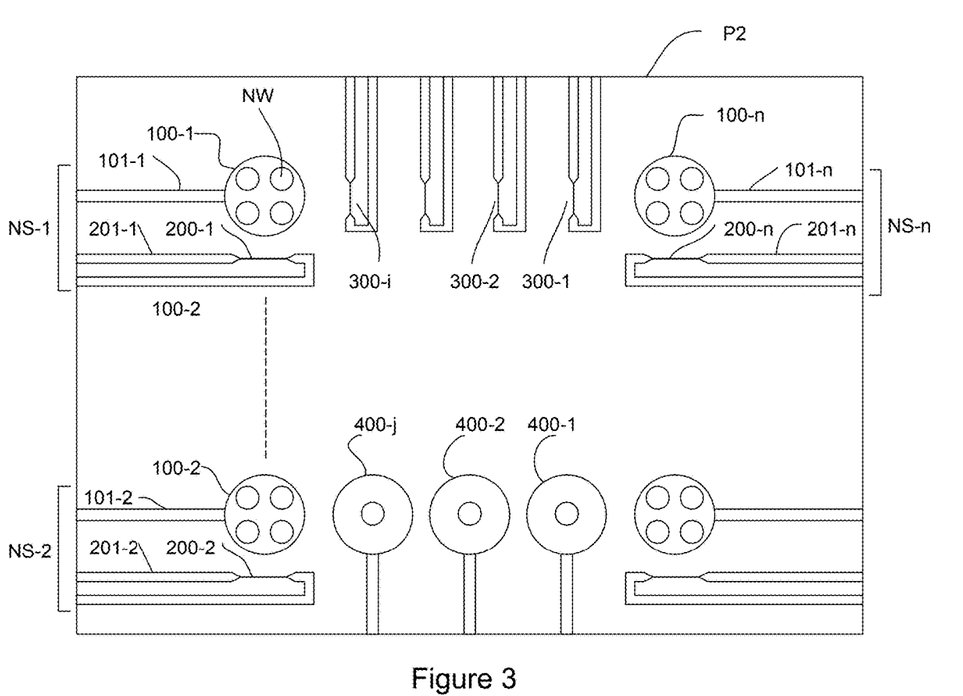
FIG. 3 describes a second embodiment of a platform of the present technique.

In this second embodiment of the platform of the present technique, as illustrated in FIG. 3, a neural cell may be placed into contact with the surface of the platform P1, which disposes of an array of soma nano-probes (100-1, . . . 100-n) comprising one to nine (for example four) vertical nano-wires directly in contact with a conductive line of access (101-1, . . . 101-n). This primary array is called an array of soma nano-probes because it is intended to receive the somas of the cells unlike, as explained here below, the route nano-probes. Each nano-probe, except for its tip and the conductive line of access, is coated with an insulating layer (not shown). The soma nano-probes (100-1, . . . 100-n) are in communication with a rim of the platform via a dedicated conductive line of access (101-1, . . . 101-n) that is electrically connectable (connected) to an instrument (also not shown) to generate or detect an electrical signal. The platform can thus be used to study the neuron-neuron interactions, for example by sending an electrical signal in a neuron of a neural network via one or more nano-probes in electrical contact with this neuron and then in detecting the electrical signals of another neuron of the network via the nano-probes in contact with this other neuron.

In addition to these nano-probes, the platform P1 comprises silicon finned transistors (nano-FETs) used for the extracellular detection and measurement of the concentrations of ions (ion concentration). These nano-FETs (200-1, . . . , 200-n) are disposed as closely as possible to the soma nano-probes to measure the resulting ion concentrations. These nano-FETs (200-1, . . . , 200-n) being close to the soma nano-probes (100-1, . . . , 100-n) allow to form a couple comprising a nano-FET and a nano-probe, called nano-sensor (NS-1, . . . , NS-n). Other sensors (nano-probes or nano-FETs) are also distributed on the pathways to follow the propagation. These pathways make it possible to connect the different soma nano-probes (100-1, . . . , 100-n) to one another to form an array of soma nano-probes. The object of these pre-set pathways (routes) as explained here above is to guide the culture of the cells according to predetermined parameters. The goal of this guidance is to constitute a network of cells connected to one another, so as to be able to measure values of potentials and of quantity of ion current between these cells when they are positioned (cultivated) on the array of nano-probes and when the dendrites or axons enable the propagation of electrical current from one cell to another. In order to ensure precise measurements, the nano-probes or nano-FETs are positioned along the routes (paths) for which it is known, through the surface specialization of the platform, that they will be the receptacles of the dendrites or axons of the cells during their growth. The nano-FETs (200-1, . . . , 200-n) are in communication with a rim of the platform via a dedicated conductive line of access (201-1, . . . , 201-n) that is electrically connectible (connected) to an instrument (also not shown) to detect an electrical signal and more particularly an ion current. Thus, when electrical activity gets propagated in the cells, the nano-probes can measure the potential that is being propagated (and especially the speed of propagation of this potential) from one cell to the other, as much as the outgoing and incoming electrical potentials and also as well as the ion concentrations.

In at least one embodiment, such as the one shown with reference to FIG. 3, a route between two soma nano-probes comprises nano-FETs (300-1, . . . , 300-1) and/or route nano-probes (400-1, . . . , 400-j). These route nano-probes make it possible to measure the electrical potential at different locations of the dendrites or axons (only two paths are shown in the figure for greater readability).

The nano-probes and nano-FETs (silicon finned transistors) used in the present technique can be formed by any electrically conductive material whatsoever, preferably an inorganic material such as silicon, a metal, a compound semi-conductor, a conductive oxide and a silicide. The insulating layer lining the components of this platform is formed by a material with low cytotoxicity, such as silicon oxide, aluminum oxide and silicon nitride. The tips of the nano-probes are either exposed (i.e. for example free of an insulating coating layer) or coated with an electrically conductive layer, as is explained here below in the context of the presentation of the method of fabrication of said platform, according to a top-down approach. The electrically conductive layer is also formed by a material with low cytotoxicity, such as gold, silver and platinum, an alloy of these materials or a conductive organic material (for example, pedot:pss).

5.4. Details of the Method of Co-Integrated Fabrication of a Platform

A nano-wire-based measurement platform as presented here above is obtained by means of a substrate with four inches of silicon-on-insulator (SOI) (active Si 4 μm/buried oxide 1 μm/substrate 400 μm). A top-down approach is used with a method of fabrication by UV photolithography using an i-line stepper photo-repeater followed by RIE plasma etching in order to reduce fabrication costs and facilitate large-scale fabrication. To increase the reproducibility of the method on the entire substrate, an anti-reflective coating (BARC) is used under the photo-sensitive resin.

Figure 6:
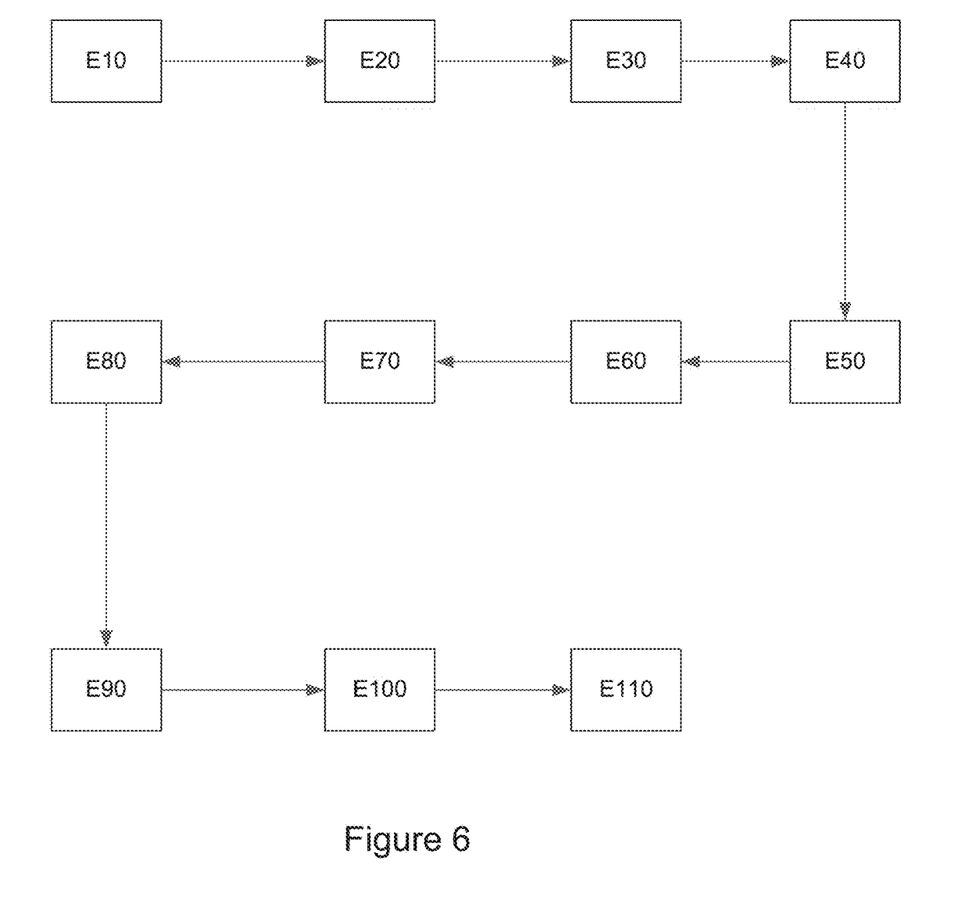
FIG. 6 is a simplified representation of the method for manufacturing a platform in one particular embodiment.

More particularly, with reference to FIG. 6, the fabrication method comprises the following steps that are carried out on a base comprising a substrate on which there is deposited a 1 μm layer of silicon dioxide ($SiO_2$), itself coated with a 4 μm layer of monocrystalline silicon (Si):

fabrication (E10) of vertical nano-wires: vertical structuring of the platform:
  this fabrication is based on a photolithography technique, comprising a local deposit of a resin pattern that serves as a protection mask (resistant nano-pad with a diameter of 500 nm), using a conventional organic resin (for example of the ECI 3012 type); and
  RIE etching (deep reactive ion etching) of 3.5 μm: dry etching by ion bombardment (coming from a plasma); this technique has the advantage of high etching anisotropy: the boundary between the etched areas and non-etched areas will be most often rectilinear and vertical; the remaining resin (resin coming from the preceding sub-step) is removed by chemical etching;
  at the end of this first step, the platform has vertical nano-wires, forming groups constituted by one to four nano-wires and distributed on the platform to form an embryonic array that is reworked in the following steps in order to add the expected properties to them;
creation (E20) of the nano-FETs and of the lines of access: planar structuring of the platform:
  depositing a thick resin photo-layer (5 μm) to protect and to avoid damaging the nano-wires previously obtained;
  photolithography to define the zone to be masked according to a method identical to that of the previous step to plot the nano-FETs (channels and lines of access), as well as the lines of access of the nano-probes;
  etching until the buried oxide (BOx) of the SOI is reached: the silicon is hollowed out to a depth of about 0.5 μm;
  at the end of this second step, the platform has vertical nano-wires and a nano-FET embryo, attached by lines of access to electrical contacts, at the edge of the platform, which like the nano-wires are distributed on the platform to complete the array or arrays of groups of nano-wires;
joint thinning (E30) of the volumes of nano-wires and fins of the nano-FETs by sacrificial oxidation:
  wet oxidation to about 850° C. for 60 minutes, on full plate, is carried out; this operation makes it possible to prepare the reduction of diameter of the nano-wires from about 500 nm to about 200 nm and to prepare the thinning of the channel of the nano-FETs to about 20 nm;
  this operation also makes it possible to eliminate the surface defects induced by plasma etching and to improve the anisotropy of the nano-probe;
  the channel of each nano-FET is then protected with resin by photolithography;
  then HF Buffer wet etching (5%) is done: it enables the removal of the oxide on all the surfaces, except for the surfaces of the nano-FET channels because the resin is not attacked: besides, each channel is coated with oxide ($SiO_2$).
P type doping (E40) of the source zones(S) and drain zones (D) of the nano-FETs, nano-wires and lines of access:
  this step consists of an implantation of boron at $10^{20}$ atm/cm3 on the entire platform except for the channels of the nano-FETs, which remain protected by the resin of the previous step;
the channel is not doped in order to preserve its sensitivity.

removal of the masking resin of the channel of the nano-FETs and annealing to activate the dopant:
the resin is removed from the channel and the dopant is activated by temperature (about 1000° C. for about 30 minutes);
this annealing phase electronically activates the dopant in the silicon;
at the end of this step, there is a platform comprising vertical nano-wires, the zones S and D of the nano-FETs and the lines of access made of doped Si: only the channels remain coated with oxide.

silicidation (E50) of the platinum:
to create weakly resistive zones S and D (nano-FETs) and to improve the interface between the nano-probe and the liquid medium, a step of isotropic full-plate deposition of platinum is carried out;
an activation annealing (500° C. for 3 mins) is then used to create the alloy PtSi; the advantage here is that the PtSi is created only when the Pt is in direct contact with the Si and not with SiO2: the technique used therefore makes it possible to have no PtSi on the BOX (constituted by SiO2), or on the channel of the nano-FETs, thus preserving the sensitivity of measurement of these elements.

An advantage of the fabrication method as proposed is noted here: it is not necessary to carry out a step of lithography for the implantation on metal: there is no need to cover the channel with resin because it is already protected by the Si oxide. However, this is not the only advantage: this step of platinum silicidation greatly increases the integration of the nano-devices while providing for high biocompatibility with the living medium and this is achieved through the process of annealing to activate the platinum on the Si.

selective etching (E60) of the Pt relative to PtSi with aqua regia (chemical mixture of HCl:HNO$_3$:DI water which enables the etching only if the metal: the silicon is not attacked):
this is a step of selective chemical etching that enables the etching of the unconverted Pt (coming from the previous step) without attacking the PtSi: the Pt (unconverted) is therefore removed from the BOx and from the channels of the nano-FETs;
the utility of PtSi is twofold: from the viewpoint of the nano-probe, it does not get oxidized (as compared with Si alone) and preserves low impedance at the electrolyte/probe interface over time; from the viewpoint of the nano-FETs: it delivers low surface/volume contact resistance improving the sensitivity of the nano-FETs.

metallization (E70) of aluminum (Alu) reducing the resistance of the lines of access:
a deposit, conformed on the entire platform, of Alu (500 nm) followed by photolithography and chemical etching of the aluminum that is unprotected by resin "etch-back" is then implemented to metalize the lines of access;
the aluminum is preserved only on the access line.

the insulation (E80) of the platform relative to the medium:
an oxide (isolation oxide) is then deposited in a manner conformed in order to insulate the nano-wires and the nano-FETs of the (future) culture medium: the oxide used can be SiO2, AL2O3 or HfO2, or a specific dielectric;

opening (E90) the tip of the nano-wires, external contacts, and the channels of the nano-FETs (core-shell structure):
a step of photolithography is used by means of a thick resin (5 μm) to etch the (insulation) oxide previously deposited at the external contacts (of the lines of access) and at the channel of the nano-FET (between the source and the drain);
the remaining resin is then reduced in thickness by O2 plasma etching to clear the top of the nano-probe;
the height of the resin can vary between 1 and 3 μm depending on the dimensions of the sensitive contact desired for the nano-probe.

chemical etching (E100) of the opened oxide:
the opened zones of the resin are chemically etched by means of an HF buffer solution (5%); this etching is used to clear the tip of the nano-probe, de-oxidize the external contacts and reduce the thickness of oxide on the channel to improve the detection and/or the measurement;
the resin is then eliminated;
at the end of this step, there is a platform comprising an array of nano-wires forming groups of nano-wires (one group comprising one to four nano-wires), nano-FETs disposed in proximity to the nano-probe; and lines of access to all these components from the periphery of the platform, this being achieved whatever its mapping.

As constituted, at the end of this oxide chemical etching step, this platform, fabricated according to the method explained here above, resolves the problems related to the joint extracellular measurement, using one and the same platform, of an electrical potential using at least one nano-probe, and of the ion concentration using one or more transistors (nano-FETs). All these steps make it possible to obtain a device or a platform in a single operation, which is not possible with the prior-art fabrication methods. However, in order to subsequently enable experiments on neural cultures with a directed growth of the cells on the platform, the inventors have implemented an additional step of specialization of the surface of the platform, this additional step enabling constraints on the culture and growth of the cells at predetermined locations, as has been presented here above. More particularly, according to the present technique, the fabrication method furthermore comprises a step of chemical functionalization (E110) comprising a photolithography operation to define the clinging patterns of the cells and more specifically the hydrophilic patterns.

These patterns are made at specific platform zones on which it is desired to promote the growth of the cells. Hydrophilic zones of greater surface areas are created at the nano-probes, at places where it is desired to promote the implantation of soma. Hydrophilic zones are also created in the extension of the nano-probes in order to enable cell extensions (axons, dendrites if necessary) in order to direct the growth of these extensions towards other nano-probes, on which other somas will be fixed.

5.5. Miscellaneous

All the characteristics described can be combined and this can be done in any combination whatsoever. Each characteristic disclosed in this specification can be replaced by an equivalent characteristic serving the same purpose. Thus, unless otherwise indicated, each characteristic described is only one example of a generic series of equivalent or similar characteristics.

In a manner complementary to the aspects described here above, the platform that is the object of the present invention can be implemented in different ways. One advantage of this platform, provided by the fact that each nano-device is addressable, is that it can be used to carry out a localizing of the cells deposited (and/or put into growth) at very precise places on the platform, which is not possible in the prior art. Besides, the use of the platform is not limited to neural type cells but can be implemented for any type of cell, with a modification of the distance between the components of the nano-probes. The nano-probes can be used, on the one hand, to measure a potential and, on the other hand, to transmit an electrical impulse to the cells on the other hand. This transmission of an impulse can be used to locally open the wall of the stimulated cell precisely and reversibly. The transmission of an impulse can also be used, in certain conditions, to provoke an excitation of the cell.

The invention claimed is:

1. A platform for cellular interfacing comprising:
   a substrate;
   a plurality of nano-probes fabricated on said substrate, each comprising one or more vertical nano-wires, each being directly connected to a conductive line of access on the substrate and including a conductive extremity configured to contact a cell;
   a plurality of field-effect transistors called nano-FETs, fabricated on said substrate, jointly with the nano-probes; and
   a set of nano-sensors, each nano-sensor comprising one of the nano-probes and one of the nano-FETs positioned at a predetermined distance from said nano-probe.

2. The platform according to claim 1, wherein in a nano-sensor, a nano-probe and a nano-FET are spaced out by a distance of 1 to 5 micrometers.

3. The platform according to claim 1, wherein the platform further comprises a set of nano-probes and a set of nano-FETs distributed on said platform to form at least one array of nano-sensors comprising at least one predetermined route.

4. The platform according to claim 1, wherein the platform further comprises hydrophilic zones localized at the level of the nano-probes and of said at least one nano-FET.

5. The platform according to claim 3, wherein the platform further comprises a plurality of predetermined routes, each predetermined route connecting at least two nano-probes of said array of nano-probes.

6. The platform according to claim 5, wherein the platform further comprises hydrophilic zones localized at the level of said predetermined routes.

7. The platform according to claim 5, wherein each predetermined route between two nano-probes comprises a plurality of nano-FETs, each nano-FET being implanted at regular intervals along the route.

8. The platform according to claim 5, wherein each predetermined route between two nano-probes comprises a plurality of route nano-probes, each route nano-probe being implanted at regular intervals along the route.

9. The platform according to claim 1, wherein said at least one nano-probe comprises between one and nine nano-wires.

10. The platform according to claim 1, wherein the nano-FET is a fin-FET type of finned transistor.

11. A method for fabricating a platform for intracellular interfacing, of a top-down type, wherein the method comprises:
    forming a plurality of nano-probes on a substrate including vertically structuring one or more vertical nano-wires on the substrate, each vertical nano-wire being directly connected to a conductive line of access on the substrate and including a conductive extremity configured to contact a cell; and
    planar structuring at least one field-effect transistor called a nano-FET on said substrate,
    wherein a set of nano-sensors are formed on the substrate, each nano-sensor comprising one of the nano-probes and one of the nano-FETs positioned at a predetermined distance from said nano-probe.

12. The method for fabricating the platform for intracellular interfacing according to claim 11, wherein, subsequently to the planar structuring of said at least one nano-FET, said method comprises platinum silicidation prompting implantation of a layer of platinum silicide on said at least one nano-probe and on a source zone and drain zone of said at least one nano-FET.

13. The method for fabricating the platform for intracellular interfacing according to claim 11, wherein the method furthermore comprises adjoining, to the nano-wires, said at least one nano-probe made of a conductive organic material.

14. The method for fabricating the platform for intracellular interfacing according to claim 11, wherein subsequently to the planar structuring of said at least one nano-FET, the method comprises functionalization of the surface of said platform defining a plurality of hydrophilic zones.

15. The method for fabricating the platform for intracellular interfacing according to claim 13, wherein the conductive organic material comprises PEDOT:PSS.

* * * * *